United States Patent [19]
Swanson et al.

[11] Patent Number: 5,987,459
[45] Date of Patent: Nov. 16, 1999

[54] IMAGE AND DOCUMENT MANAGEMENT SYSTEM FOR CONTENT-BASED RETRIEVAL

[75] Inventors: Mitchell D. Swanson, Minneapolis; Ahmed H. Tewfik, Edina, both of Minn.; Srinath Hosur, Plano, Tex.

[73] Assignee: Regents of the University of Minnesota, Minneapolis, Minn.

[21] Appl. No.: 08/818,535

[22] Filed: Mar. 14, 1997

Related U.S. Application Data

[60] Provisional application No. 60/013,468, Mar. 15, 1996.

[51] Int. Cl.$^6$ .................................................. G06F 17/30
[52] U.S. Cl. ........................................ 707/6; 707/3; 707/9
[58] Field of Search ..................... 707/1–10, 100–104, 707/200–206; 705/34; 395/200.34; 345/501

[56] References Cited

U.S. PATENT DOCUMENTS

| | | | |
|---|---|---|---|
| 4,495,620 | 1/1985 | Steele et al. | 370/118 |
| 4,969,041 | 11/1990 | O'Grady et al. | 358/142 |
| 5,010,405 | 4/1991 | Schreiber et al. | 358/141 |
| 5,060,262 | 10/1991 | Bevins, Jr. et al. | 380/19 |
| 5,315,098 | 5/1994 | Tow | 235/494 |
| 5,325,290 | 6/1994 | Cauffman et al. | 705/34 |
| 5,379,345 | 1/1995 | Greenberg | 380/23 |
| 5,386,240 | 1/1995 | Hori | 348/473 |
| 5,450,490 | 9/1995 | Jensen et al. | 380/6 |
| 5,461,426 | 10/1995 | Limberg et al. | 348/475 |
| 5,465,269 | 11/1995 | Schaffner et al. | 375/200 |
| 5,465,308 | 11/1995 | Hutcheson et al. | 382/159 |
| 5,473,631 | 12/1995 | Moses | 375/202 |
| 5,515,296 | 5/1996 | Agarwal | 395/200.34 |
| 5,579,471 | 11/1996 | Barber et al. | 345/326 |
| 5,710,719 | 1/1998 | Houle | 364/514 R |
| 5,710,916 | 1/1998 | Barbara et al. | 707/9 |

FOREIGN PATENT DOCUMENTS

| | | | |
|---|---|---|---|
| 0 635 798 A1 | 1/1995 | European Pat. Off. | G06F 17/30 |
| 0 657 831 A1 | 6/1995 | European Pat. Off. | G06F 17/30 |
| 7-160731 | 6/1995 | Japan | G06F 17/30 |

OTHER PUBLICATIONS

Aizawa, K., "Model–Based Image Coding", *Proceedings of the SPIE, Visual Communications and Image Processing '94*, vol. 2308, Chicago, IL, 1035–1049 (Sep. 25–29, 1994).

Baritaud, T., et al., "On the Security of the Permuted Kernel Indentification Scheme", *Proceedings of the 12th Annual International Cryptology Conference,* Advances in Cryptology—CRYPTO '92, Brickell, E.F., (ed.), Santa Barbara, CA, 305–311 (Aug. 16–20, 1992).

Bender, W., et al., "Techniques for Data Hiding", *IBM Systems Journal,* 35, 313–336 (1996).

Bender, W., et al., "Techniques for Data Hiding", *SPIE,* 2420, 164–173 (1995).

Boland, F.M., et al., "Watermarking Digital Images for Copyright Protection", *IEE International Conference on Image Processing and Its Applications,* Edinburgh, Scotland, 326–330 (Jul. 4–6, 1995).

Boney, L., et al., "Digital Watermarks for Audio Signals", *Proceedings of the 1996 IEEE International Conference on Multimedia Computing and Systems,* Multimedia '96, Hiroshima, Japan, 473–480 (Jun. 1996).

(List continued on next page.)

*Primary Examiner*—Ruay Lian Ho
*Attorney, Agent, or Firm*—Schwegman, Lundberg, Woessner, and Kluth, P.A.

[57] ABSTRACT

A computerized image and document management system for tent-based retrieval integrating content-based retrieval support directly into the compressed files. The system minimizes a weighted sum of the expected size of the compressed files and the expected query response time. Object searching of documents stored by the system is possible on a scalable resolution basis. The system includes a novel object representation based on embedded prototypes that provides for high-quality browsing of retrieval images at low bit rates.

21 Claims, 13 Drawing Sheets

OTHER PUBLICATIONS

Bors, A.G., et al., "Image Watermarking Using DCT Domain Constraints", *Proceedings of the 1996 IEEE International Conference on Image Processing,* vol. III, Lausanne, Switzerland, 231–234 (Sep. 16–19, 1996).

Bouman, C., et al., "Multiple Resolution Segmentation of Textured Images", *IEEE Transactions on Pattern Analysis and Machine Intelligence,* 13, 99–113 (Feb. 1991).

Cawkell, A.E., "Picture–Queries and Picture Databases", *The Journal of Information Science,* 19, 409–423 (1993).

Chalom, E., et al., "Segmentation of an Image Sequence Using Multi–Dimensional Image Attributes", *Proceedings of the 1996 IEEE International Conference on Image Processing,* vol. II, Lausanne, Switzerland, 525–528 (Sep. 16–19, 1996).

Chan, W.–Y., et al., "Generalized Product Code Vector Quantization: A Family of Efficient Techniques for Signal Compression", *Digital Signal Processing,* 4, 95–126 (1994).

Chang, S.–F., "Compressed–Domain Techniques for Image/Video Indexing and Manipulation", *Proceedings of the 1995 IEEE International Conference on Image Processing,* vol. 1, Washington, D.C., 314–317 (Oct. 23–26, 1995).

Chang, S.–F., et al., "Transform Coding of Arbitrarily–Shaped Image Segments", *Proceedings of the ACM, Multimedia 93,* Anaheim, CA, 83–90 (Aug. 1–6, 1993).

Chitprasert, B., et al., "Human Visual Weighted Progressive Image Transmission", *IEEE Transactions on Communications,* 38, 1040–1044 (Jul. 1990).

Corset, I., et al., "MPEG–4: Very Low Bit Rate Coding for Multimedia Applications", *Proceedings of the SPIE, Visual Communications and Image Processing '94,* vol. 2308, Chicago, IL, 1065–1073 (Sep. 25–29, 1994).

Cox, I.J., et al., "Secure Spread Spectrum Watermarking for Images, Audio and Video", *Proceedings of the 1996 IEEE International Conference on Image Processing,* vol. III, Lausanne, Switzerland, 243–246 (Sep. 16–19, 1996).

Craver, S., et al., "Can Invisible Watermarks Resolve Rightful Ownership?", *IBM Research Technical Report, RC 20509, IBM CyberJournal,* 23 p. (Jul. 25, 1996).

Daubechies, I., et al., "Orthonormal Bases of Compactly Supported Wavelets", *Communications on Pure and Applied Mathematics, XLI,* 909–996 (Oct. 1988).

Faloutsos, C., et al., "Signature Files: An Access Method for Documents and Its Analytical Performance Evaluation", *ACM Transactions on Office Information Systems,* 2, 267–288 (Oct. 1984).

Flickner, M., et al., "Query by Image and Video Content: The QBIC System", *Computer,* 28, 23–32 (Sep. 1995).

Gary, J.E., et al., "Shape Similarity–Based Retrieval in Image Database Systems", *Proceedings of the SPIE, Image Storage and Retrieval Systems,* vol. 1662, San Jose, CA, 2–8 (Feb. 13–14, 1992).

Girod, B., "The Information Theoretical Significance of Spatial and Temporal Masking in Video Signals", *Proceedings of the SPIE, Human Vision, Visual Processing and Digital Display,* vol. 1077, 178–187 (1989).

Gruber, J., "Smart Paper", *Wired,* 2, 46 (Dec. 1994).

Gudivada, V.N., et al., "Content–Based Image Retrieval Systems", *Computer,* 28, 18–22 (Sep. 1995).

Hartung, F., et al., "Digital Watermarking of Raw and Compressed Video", *SPIE,* 2952, 205–213 (Oct. 1996).

Hirata, K., et al., "Rough Sketch–Based Image Information Retrieval", *NEC Research & Development,* 34, 463–473 (Apr. 1993).

Hirotsugu, K., "An Image Digital Signature System with ZKIP for the Graph Isomorphism", *Proceedings of the 1996 IEEE International Conference on Image Processing,* vol. III, Lausanne, Switzerland, 247–250 (Sep. 16–19, 1996).

Hsu, C.–T., et al., "Hidden Signatures in Images", *Proceedings of the 1996 IEEE International Conference on Image Processing,* vol. III, Lausanne, Switzerland, 223–226 (Sep. 16–19, 1996).

Huang, Z., et al., "Affine–Invariant B–Spline Moments for Curve Matching", *IEEE Transactions on Image Processing,* 5, 1473–1480 (Oct. 1996).

Huffman, D.A., "A Method for the Construcion of Minimum–Redundancy Codes", *Proceedings of the IRE,* 40, 1098–1101 (1952).

Jacobs, C.E., et al., "Fast Multiresolution Image Querying", *Proceedings of the ACM, SIGGRAPH Conference on Computer Graphics,* Los Angeles, CA, 277–286 (1995).

Jayant, N., et al., "Signal Compression Based on Models of Human Perception", *Proceedings of the IEEE,* 81, 1385–1422 (Oct. 1993).

Johnson, J.D., et al., "Wideband Coding—Perceptual Considerations for Speech and Music", In: *Advances in Speech Signal Processing,* Furui, S., et al., (eds.), Dekker, New York, pp. 109–140 (1992).

Le Gall, D., "MPEG: A Video Compression Standard for Multimedia Applications", *Communications of the ACM,* 34, 46–58 (Apr. 1991).

Legge, G.E., et al., "Contrast Masking in Human Vision", *The Journal of the Optical Society of America,* 70, 1458–1471 (Dec. 1980).

Lin, H.–C., et al., "Color Image Retrieval Based on Hidden Markov Models", *Proceedings of the 1995 IEEE International Conference on Image Processing,* vol. 1, Washington, D.C., 342–345 (1995).

Macq, B.M., et al., "Cryptology for Digital TV Broadcasting", *Proceedings of the IEEE,* 83, 944–957 (Jun. 1995).

Manjunath, B.S., et al., "Browsing Large Satellite and Aerial Photographs", *Proceedings of the 1996 IEEE International Conference on Image Processing,* vol. II, Lausanne, Switzerland, 765–768 (Sep. 16–19, 1996).

Matsui, K., et al., "Video–Steganography: How to Secretly Embed a Signature in a Picture", *IMA Intellectual Property Project Proceedings,* vol. 1, 187–206 (Jan. 1994).

Nam, J., et al., "Combined Audio and Visual Streams Analysis for Video Sequence Segmentation", Proceedings of the 1997 IEEE International Conference on Acoustics, Speech and Signal Processing, vol. IV, Munich, Germany, 2665–2668 (Apr. 21–24, 1997).

Niblack, W., et al., "The QBIC Project: Querying Images by Content Using Color, Texture and Shape", *Proceedings of the SPIE, Storage and Retrieval for Image and Video Databases,* vol. 1908, 173–187 (1993).

Nill, N.B., "A Visual Model Weighted Cosine Transform for Image Compression and Quality Assessment", *IEEE Transactions on Communications, COM–33,* 551–557 (Jun. 1985).

Noll, P., "Wideband Speech and Audio Coding", *IEEE Communications Magazine,* 31, 34–44 (Nov. 1993).

O Ruanaidh, J.J.K., et al., "Phase Watermarking of Digital Images", *Proceedings of the 1996 IEEE International Conference on Image Processing,* vol. III, Lausanne, Switzerland, 239–242 (Sep. 16–19, 1996).

Pitas, I., "A Method for Signature Casting on Digital Images", *Proceedings of the 1996 IEEE International Conference on Image Processing,* vol. III, Lausanne, Switzerland, 215–218 (Sep. 16–19, 1996).

Rioul, O., et al., "Wavelets and Signal Processing", *IEEE Signal Processing Magazine,* 8, 14–38 (Oct. 1991).

Rivest, R.L., "Cryptography", In: *Handbook of Theoretical Computer Sciences,* vol. A, Van Leeuwen, J., (ed.), pp. 717–775 (1990).

Rivest, R.L., et al., "A Method for Obtaining Digital Signatures and Public–Key Cryptosystems", *Communications of the ACM,* 21, 120–126 (Feb. 1978).

Smith, J.P., "Authentication of Digital Medical Images with Digital Signature Technology", *Radiology,* 194, 771–774 (Mar. 1995).

Smith, J.R., et al., "Modulation and Information Hiding in Images", *Information Hiding,* Proceedings of the First Int. Workshop, Anderson, R., (ed.), Cambridge, U.K., 207–226 (May 30–Jun. 1, 1996).

Strang, G., "Wavelets and Dilation Equations: A Brief Introduction", *SIAM Review,* 31, 614–627 (Dec. 1989).

Swain, M.J., et al., "Color Indexing", *International Journal of Computer Vision,* 7, 11–32 (1991).

Tanaka, K., et al., "Embedding Secret Information into a Dithered Multi–Level Image", *1990 IEEE Military Communications Conference,* vol. 1, "Milcom 90: A New Era," Monterey, CA, 216–220 (Sep. 30–Oct. 3, 1990).

van Schyndel, R.G., et al., "A Digital Watermark", *Proceedings of the IEEE, ICIP–94, vol. II,* Austin, TX, 86–90 (Nov. 13–16, 1994).

Voyatzis, G., et al., "Applications of Toral Automorphisms in Image Watermarking", *Proceedings of the 1996 IEEE International Conference on Image Processing,* vol. II, Lausanne, Switzerland, 237–240 (Sep. 16–19, 1996).

Wallace, G.K., "The JPEG Still Picture Compression Standard", *Communications of the ACM,* 34, 30–44 (Apr. 1991).

Witten, I.H., et al., "Arithmetic Coding for Data Compression", *Communications of the ACM,* 30, 520–540 (Jun. 1987).

Wolfgang, R.B., et al., "A Watermark for Digital Images", *Proceedings of the 1996 IEEE International Conference on Image Processing,* vol. III, Lausanne, Switzerland, 219–222 (Sep. 16–19, 1996).

Wunsch, P., et al., "Wavelet Descriptors for Multiresolution Recognition of Handprinted Characters", *Pattern Recognition,* 28, 1237–1249 (Aug. 1995).

Zhu, B., et al., "Image Coding with Mixed Representations and Visual Masking", *Proceedings of the 1995 IEEE International Conference on Acoustics, Speech and Signal Processing,* vol. 4, Detroit, MI, 2327–2330 (May 9–12, 1995).

Zhu, B., et al., "Low Bit Rate Near–Transparent Image Coding", *Proceedings of the SPIE, International Conference on Wavelet Applications for Dual Use,* vol. 2491, Orlando, FL, 173–184 (1995).

Zhu, S.C., et al., "Region Competition: Unifying Snakes, Region Growing, Energy/Bayes/MDL for Multi–band Image Separation", *Proceedings of the IEEE Fifth International Conference on Computer Vision,* Massachusetts Institute of Technology, Cambridge, MA, 416–423 (Jun. 20–23, 1995).

Ziv, J., et al., "A Universal Algorithm for Sequential Data Compression", *IEEE Transactions on Information Theory, IT–23,* 337–343 (May 1977).

FIG. 7(a)
FIG. 7(b)
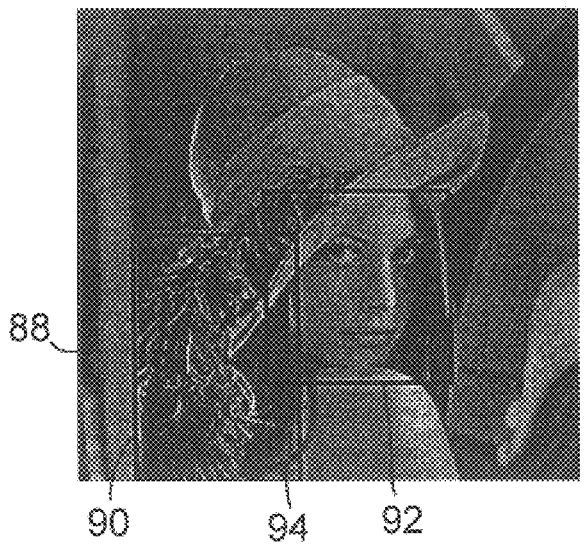
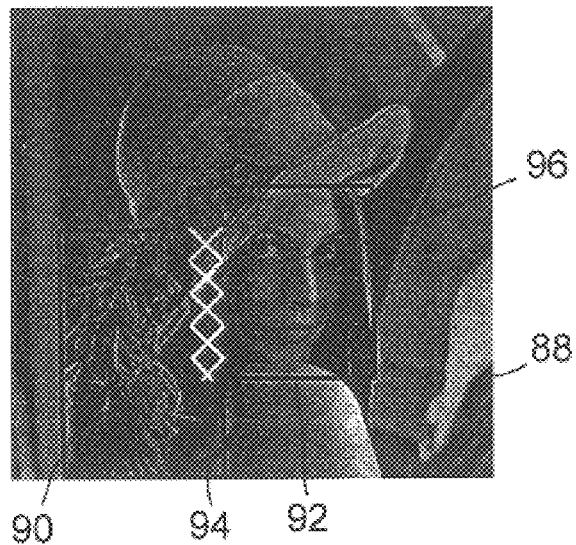

IMAGE AND DOCUMENT MANAGEMENT SYSTEM FOR CONTENT-BASED RETRIEVAL

RELATED APPLICATIONS

This application claims the benefit of U.S. Provisional Application No. 60/013,468, filed Mar. 15, 1996, which is hereby incorporated by reference.

FIELD OF THE INVENTION

This invention relates generally to image and document management systems, and particularly to such systems that permit content-based retrieval of images and documents.

BACKGROUND OF THE INVENTION

Sophisticated data management techniques are typically required for large image collections and databases, such as online digital libraries, digital art collections, biomedical imagery, merchandise catalogs, satellite imagery, and fingerprint and mug-shot imagery. The use of such image (data) management systems is necessary in order to efficiently store the image collection and provide content-based searching of the images. The systems assist users to retrieve relevant images based on their content (e.g., specific colors, textures, shapes, etc.).

Traditionally, data compression has been used to efficiently store the images, and a separate indexing structure has been used to permit retrieval of the images. That is, image management systems typically treat compression and indexing as separate entities. For example, the use of inverted files as a separate indexing entity is described in G. Salton, "Introduction to Modern Information Retrieval" (New York, N.Y.: McGraw-Hill, 1983). For further example, the use of signature files as a separate indexing entity is described in I.H. Witten, et al., "Managing Gigabytes: Compressing and Indexing Documents and Images" (New York, N.Y.: Van Nostrand Reinhold, 1994).

The data management systems in which separate indexing entities are used are highly redundant and inefficient, which leads to excessive use of storage space and slow access times. Although compression efficiently represents the data, the separate indexing structure must also be stored. Since a separate indexing structure is redundant and requires additional storage space, the data management system is inefficient. Furthermore, a complete index may be as large as the compressed data, resulting in long search times.

SUMMARY OF THE INVENTION

The above-mentioned shortcomings are addressed by the present invention, which will be understood by reading and studying the following specification. The invention describes a computerized image and document management system for content-based retrieval. In a preferred embodiment, a method includes the steps of (1) extracting a plurality of query objects from at least one input file; (2) coding a set of codewords in a particular order, each codeword corresponding to a query object and having a particular length; (3) determining instances of each query object within the at least one input file; and, (4) compressing non-query object data within each input file.

In this manner, the method of the preferred embodiment creates an electronically stored file in which storage of the input files as well as an indexing structure for later content-based retrieval thereof are integrated. The file is searchable by any of the query objects through the use of their corresponding codewords, the instances of the query objects within the file having also been determined. In addition, because the non-query object data is also compressed within the preferred method, the electronically stored file completely stores the data within the input files.

In different embodiments of the invention, computerized methods, computerized systems, and data structures of varying scope are described. Still other and further aspects, advantages and embodiments of the invention will become apparent by reference to the drawings and by reading the following detailed description.

BRIEF DESCRIPTION OF THE DRAWINGS

FIG. 7($a$) is a diagram of an exemplary image document processed by a coder according to a preferred embodiment of the invention, the image having two overlapping superblock regions;

FIG. 7($b$) is a diagram showing the region of overlap between the two superblock regions of FIG. 7($a$) marked as a "Don't Care" (DC) region;

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Overview and Basic Operation of the Preferred Embodiment

Figure 1:
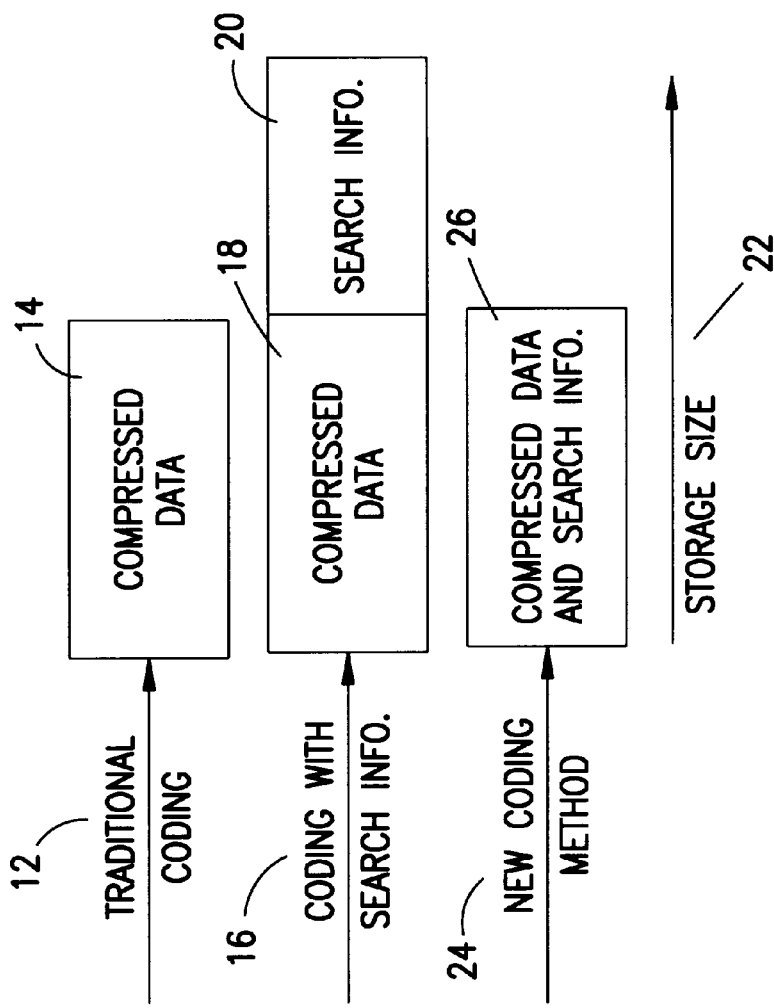
FIG. 1 is a diagram comparing the basic architectures of and the required storage sizes of prior art data management systems with the inventive data management system.
Figure 1:
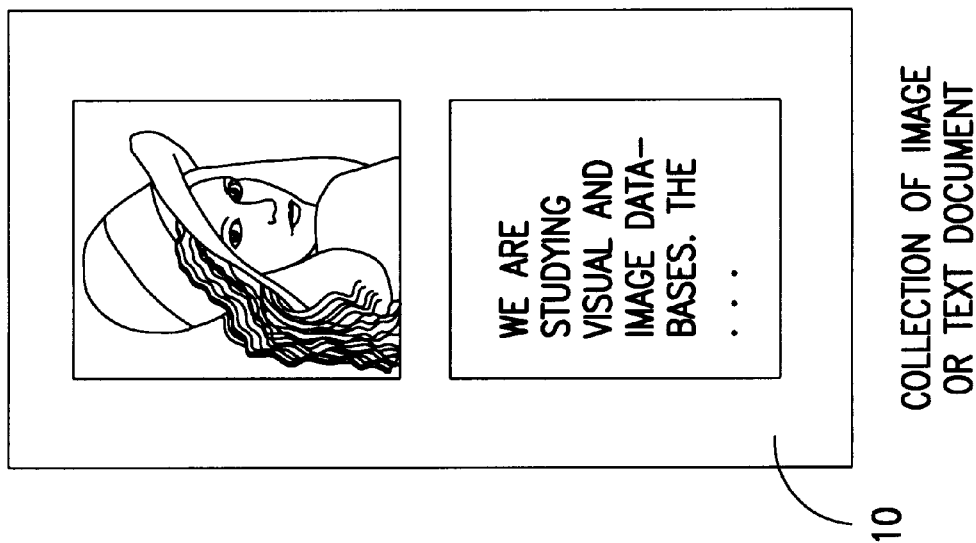

Referring to FIG. 1, a diagram comparing the basic architectures of and the required storage sizes of prior art data management systems with the inventive data management system is shown. Data collection 10 can include either image or textual documents, or both, or other types of data. In a traditional data management system, represented by arrow 12, collection 10 is compressed fairly efficiently into file 14. However, file 14 does not include an index structure for searching thereof. That is, no search information is included within file 14.

Therefore, where such a traditional data management system also includes an index structure, as represented by arrow 16, collection 10 is compressed into a data file 18, and a separate indexing structure file 20. The combined length of files 18 and 20, as compared to the length of file 14 against the storage size axis arrow 22, is significantly longer than the length of file 14 alone. As described in the background section, this is the inherent inefficiency of traditional systems.

Conversely, the inventive data management system of the preferred embodiment, as represented by arrow 24, results in file 26 having both the data of collection 10 compressed and an integrated indexing structure. The length of file 26 is only marginally longer than the length of file 14; the inclusion of an integrated indexing structure within file 26 does not significantly increase its length over file 14, which does not include an indexing structure. Furthermore, the length of file 26 is significantly shorter the combined length of files 18 and 20; including an integrated indexing structure within file 26 is more spatially efficient than having a separate index file 20 in addition to file 18.

The inventive coding technique of the preferred embodiment implicitly indexes a file collection by building query support directly into the compressed files. As will be described, the coding procedure is flexible in that it minimizes a weighted sum of the expected file size in bits (compressed file size) and the expected number of bits that need to be read to answer a query (query response time). The storage of data is efficient even though providing for content-based retrieval of data.

Figure 2:
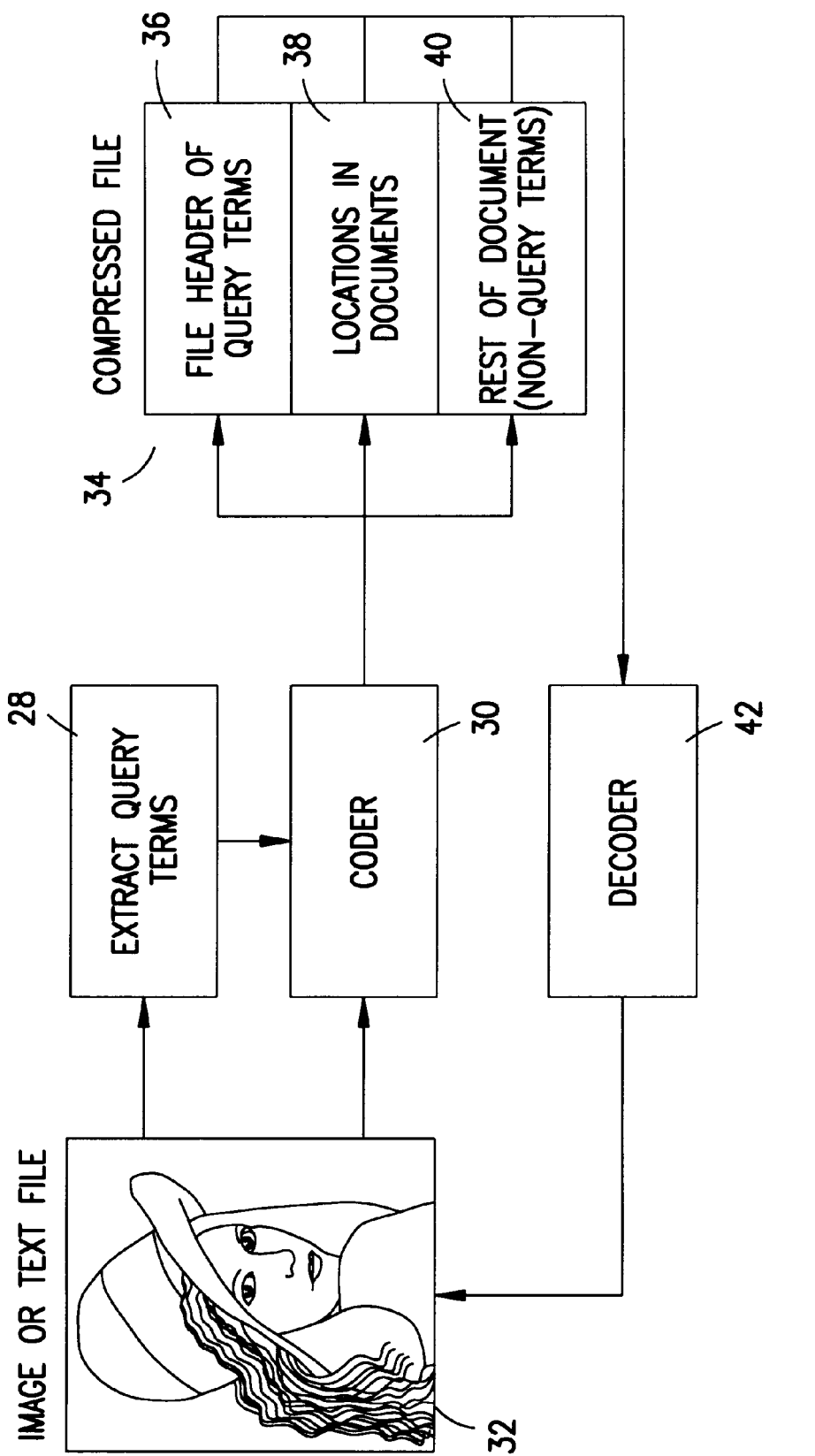
FIG. 2 is a diagram of the basic method of the preferred embodiment and the resulting preferred file data structure.

Referring next to FIG. 2, a diagram of the basic method of the preferred embodiment and the resulting preferred file data structure is shown. Steps 28 and 30 are performed on each image or text input file 32 to produce a compressed file 34 having distinct sections 36, 38 and 40, and which provide integrated retrieval support. Decoding step 42 can then be applied to file 34 to recreate each input file 32.

The query terms are first extracted from each file 32 in step 28. These query terms can be image objects, such as specific shapes, colors, things, etc., that appear within file 32, or specific textual strings (terms), that appear within file 32. In step 30 each file 32 is coded into the compressed file 34 into three sections. File header 36 includes concatenated codewords corresponding to the query terms. Section 38 includes a set of indices denoting the locations of these terms within the file 32. Section 40 includes the rest of the file 32; that is, section 40 includes non-query terms that appear within file 32. Preferably data within section 40 is compressed.

The coding technique of step 30 preferably determines the lengths of the codewords corresponding to a multiresolution representation of each query term. It also completely specifies their relative positions. Each file header 36 is therefore constructed by concatenating the codewords of a multiresolution representation of each query term that appears in that file 32. The order of the concatenation is that specified by the coding algorithm of step 30.

The file header 36 contains all the information needed to answer a content-based query. When a query is posed, the file header of each document or image is searched sequentially for the query term codewords instead of the actual file or a separate index. Since the relative order of the terms is known a priori, a search is terminated early once a codeword is read that corresponds to a query term that should appear after that corresponding to the actual query.

The decoder step 42 reconstructs a file from its coded version. If the data within section 40 had been compressed, as it is preferably, this non-query data is first decompressed. Each term within file header 36 is then decoded, and inserted into the main part of the document or image according to the coded term locations stored within section 38. Therefore, there is no ambiguity during the decoding process.

Figure 3:
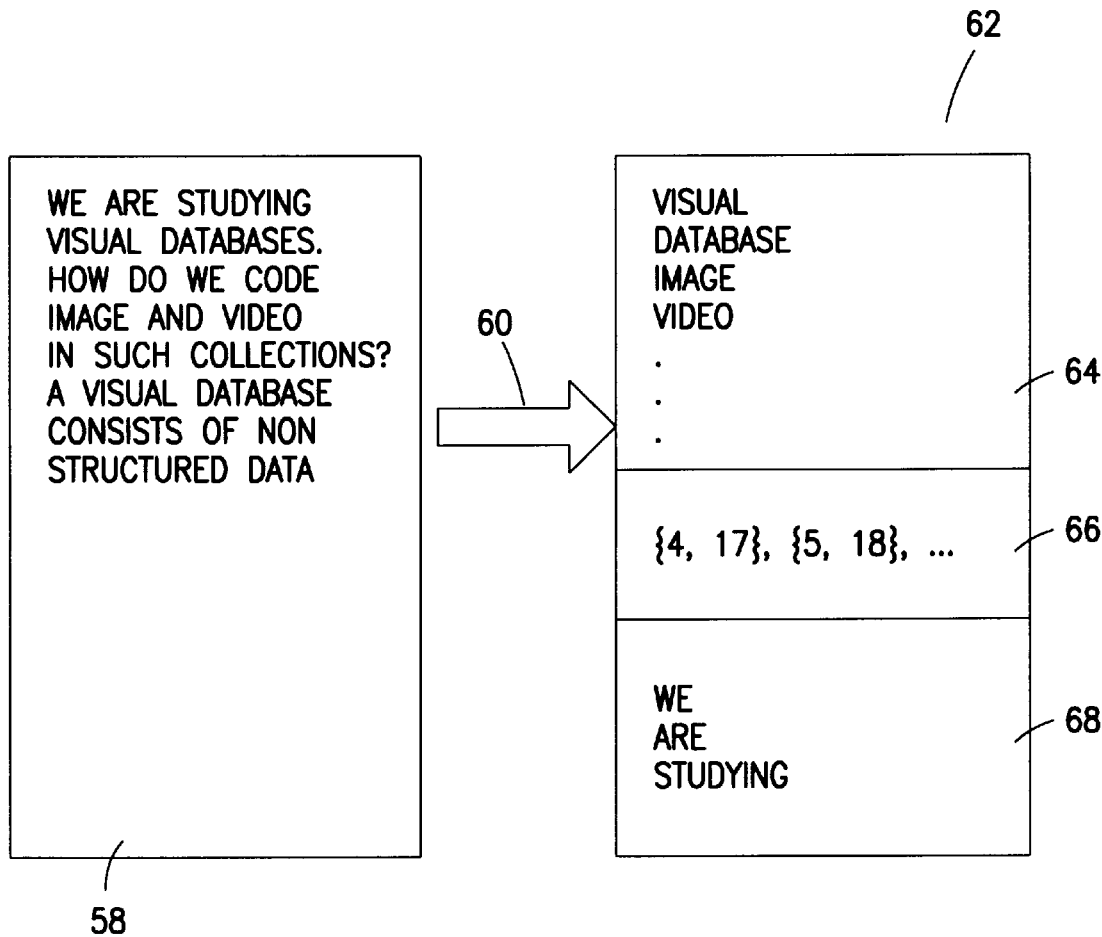
FIG. 3 is a diagram of the performance of a data management system on exemplary data according to an exemplary embodiment.

An example is illustrative to understanding the basic operation of the preferred embodiment just described. Referring now to FIG. 3, a diagram of the performance of a data management system on exemplary data according to an exemplary embodiment is shown. The inventive data management system, represented by arrow 60, transforms sample textual input file 58 into output data file 62 having file header 64, section 66 including a set of indices denoting query term locations, and section 68 including non-query term that appear within file 58.

The bolded terms within file 58 are the predetermined query terms. These include "visual, "database," "image," "video," etc. Therefore file header 64 includes a concatenated series of codewords corresponding to these terms. That is, file header 64 includes a codeword corresponding to each of "visual," "database," "image," "video," etc. Note that only the query term to which the codeword corresponds is shown in FIG. 3; the actual codeword, which is generated by an algorithm, is not shown. The algorithm also defines the order of the query terms to minimize search time.

Section 66 of file 62 includes the locations at which the query terms appear within file 58. For example, the term "visual" appears as the fourth and seventeenth terms within file 58; therefore its location index is {4, 17}. For further example, the term "database" appears as the fifth and eighteenth terms within file 58; therefore its location index is {5, 18}. Finally, section 68 of file 62 includes non-query term data appearing in file 58. That is, section 68 includes those terms that appear in file 58 but which are not query terms. Such terms include "We," "are," "studying," etc. Preferably, at least the terms within section 68 are compressed.

Searching on file 58 is not conducted directly on file 58, but rather on file 62. For example, searching for the term "index" involves stepping through the query terms as they are coded as codewords within section 64. Once the term has been found, the locations of the term are determined by reference to section 66. There is no need to reference the original file 58 at any time in the search process. That is, there is no need to first decode file 62 to obtain file 58 before conducting a search on file 58.

Decoding file 62 to reconstruct file 58 is accomplished by first decompressing the non-query data within section 68.

The codewords within section 64 are then decoded into their original query terms, and inserted at locations as specified within section 66. Finally, the decompressed non-query data is inserted into positions that remain open after the query terms have been inserted.

For example, the term "visual" as coded as a codeword in section 64 is placed as the fourth term within the file (viz., position four). Because there are no query terms as the first through the third terms within the file (viz., positions one through three), the first three terms within section 68 are inserted as these terms. This reconstructs the first four terms within file 58 as "We are studying visual."

As will be described in more detail, a major feature of the inventive preferred method is that it implements a progressive refinement retrieval by successively reducing the number of searched files as more bits are read. Based on multiresolution techniques, the file header 36 is preferably constructed in terms of a coarse-to-fine discriminant structure. At the coarsest scale, only a few bits are read and a large number of files not matching the query criteria are quickly rejected. Searching the remaining documents proceeds in terms of the next discriminant scale. This offers a significant speed improvement by quickly rejecting files as potential retrievals and concentrating searching resources on fewer files.

Another feature of the inventive preferred method is the content-based retrieval of images. Conventional image databases rely on keywords and other text (e.g., captions) associated with the images for querying. These techniques suffer from the inability of textual descriptions to effectively capture the visual properties of the underlying data. Furthermore, individual interpretations of scenes vary, leading to differences in keywords and query results. Within the preferred method, images are queried and retrieved in terms of image objects, textures, and color properties.

As will also be described in more detail, the inventive preferred method supports high quality browsing even when a minimum number of query bits are read. Rather than retrieving and displaying images in blurred form, as is typical for progressive transmission systems, image objects are represented in full detail at each stage in the retrieval via use of prototype objects. Furthermore, the inventive preferred method features progressive transmission, direct manipulation of coded data, and support for location dependency in query terms.

Hardware and Software Implementation

The invention is not limited to any particular hardware or software implementation. Included with the provisional application, the benefit of which was already claimed and which was already hereby incorporated by reference, is the listing of the computer code written in the MATLAB application language. The MATLAB application language is the preferred software implementation of the invention. MATLAB is available from The MathWorks, Inc., of Natick, Mass. The description herein is sufficient to enable one of ordinary skill within the art to make and use the invention without specific reference to the listing of computer code included with the provisional application.

Figure 4:
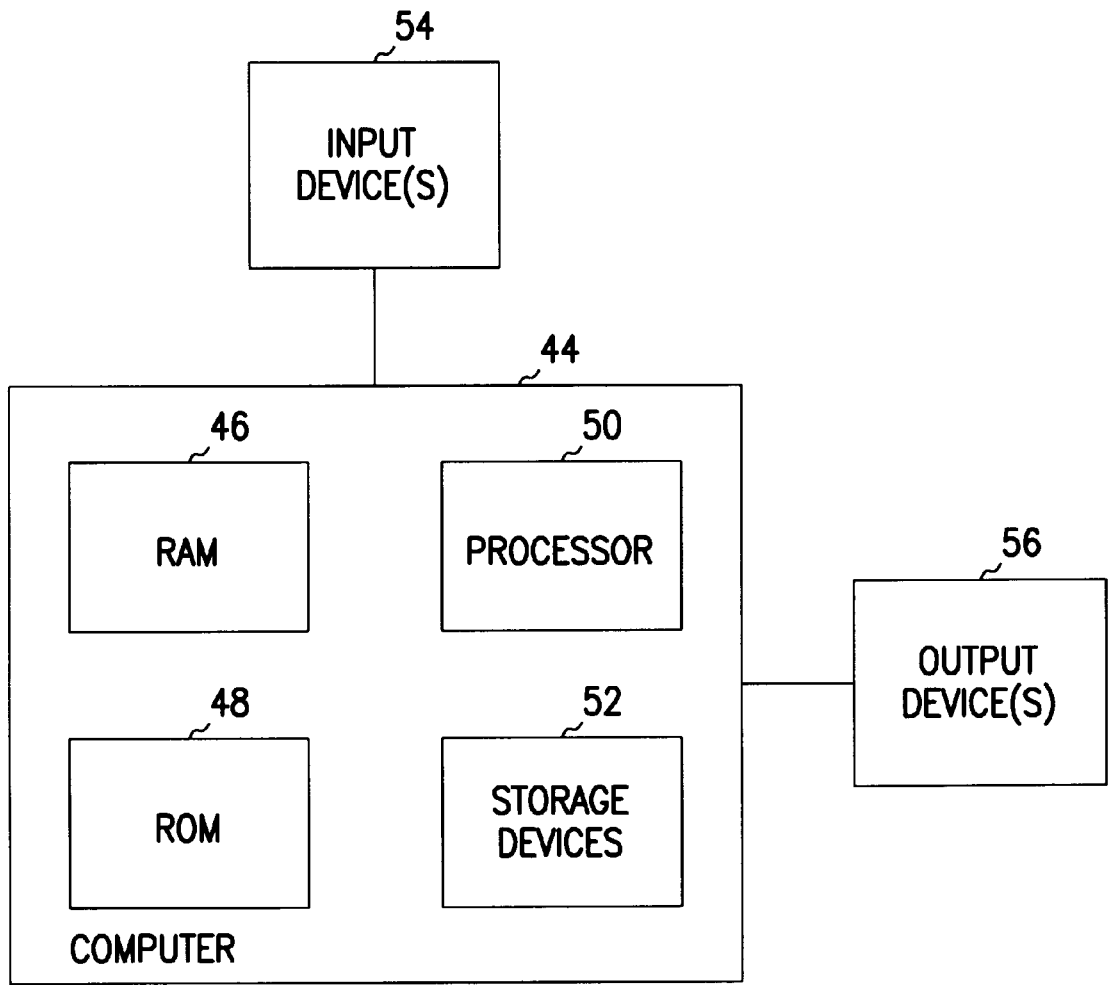
FIG. 4 is a diagram showing a typical hardware implementation of an embodiment of the invention.

The software implementation is not limited to a specific hardware implementation. MATLAB, for example, is available for use on Unix, PC-compatible, and Macintosh platforms. Each such platform has a basic configuration as shown in FIG. 4. Computer 44 may be a Unix, PC-compatible, Macintosh, or other computer, and includes random-access memory (RAM) 46, read-only memory (ROM) 48, processor 50, and one or more storage devices 52.

For example, on a PC-compatible platform running a version of the Microsoft Windows operating system, there may be thirty-two megabytes of RAM 46, the processor 50 may be an Intel Pentium Pro processor, and the storage devices 52 may include a hard disk drive having a capacity greater than two gigabytes, as well as a floppy disk drive or a removable media drive such as an Iomega Zip drive. These or other storage devices 52, as well as RAM 46 and ROM 48, are capable of storing the input and output files as described in this application.

One or more input devices 54, as well as one or more output devices 56, also typically connect to computer 44. The one or more input devices 54 may include a text entry device such as a keyboard, as well as a pointing device such as a mouse, trackball, or touch pad. The one or more output devices may include a display device such as a flat panel display or a monitor having a cathode-ray tube (CRT), as well as a laser or ink jet printer.

General Coder for Content-Based Retrieval

The coder for the content-based retrieval in a preferred embodiment (e.g., coder 30 of FIG. 2) assigns codewords to the query terms, and defines their order in the file header. Locations of the query terms and the remaining portion of the input files (e.g., non-query term data) are also stored. The coder is typically implemented in software residing within the RAM, ROM or a storage device of a computer, and is executed by a processor thereof.

The coder for content-based retrieval described in this section is general in that it is applicable to all different types of input file data. In the next section, a specific coder for only image data is described, which takes into particular account the special format of image data files, etc. However, the principles of the general coder described here are nevertheless applicable to and the same as the specific image coder described later.

The coder encodes each document to minimize a weighted sum of the expected compressed file size and the expected query response time. Each file header is constructed by concatenating the codeword for each query term that appears in that file. The order of the concatenation and the codeword lengths are defined globally based on the probability and query probability distributions of the query terms. Files coded using the coder are retrieved by sequentially searching each file header.

The coder assumes one or more input files from which a set of n query terms $t_1, t_2, \ldots t_n$ has been extracted. Note that the subscripts do not imply any ordering of the terms in the file header. For example, $t_2$ could come before $t_1$ in the header of a file which contains both terms. An order Order(t) for the terms in the file headers is defined, and a codeword of length $L_{ti}$ for each term $t_i$ is assigned. To eliminate false drops, the variable length codewords must be unique and no codeword can be a prefix of other codewords. To create such variable length and unique codewords, a Huffman algorithm is preferably used. The Huffman algorithm is known within the art. For notational convenience, an ordered set of terms $a_1, a_2, \ldots, a_n$, is introduced, the subscripts on which are used to denote the relative ordering of the terms when they occur in the file header (e.g., $a_1$ comes before $a_2$ when they both exist in a header). The ordering Order(t) associates each $t_i$ with an $a_j$.

$L_{ai}$ and $p_{ai}$ are the codeword length and the term probability of term Order $(t_j)=a_i$, respectively. The probability estimates, $p_{ai}$, are the same estimates used by entropy coders. Furthermore, query probability $q_{ai}$ is the nonzero probability that the term $a_i$ occurs in a query. For n terms, the weighted sum that must be minimized is expressed as:

$$C = E[\text{Search Length}] + kE[\text{File Length}] \quad (1)$$

Using the query term probabilities and codeword lengths, this is equivalent to $$C = \sum_{i=1}^{n} L_{a_i} p'_{a_i} + k \sum_{i=1}^{n} L_{a_i} p_{a_i} \quad (2)$$

where $$p' = p_{a_i} - \sum_{j=1}^{i-1} q_{a_j} p_{a_i a_j} \quad (3)$$

are functions of the ordering Order(t). Note that search length and file length are measured in bits. The second summand in Equation 2 is independent of the term ordering and query probabilities. The user is free to choose k>=0 to control the tradeoff between compression and query response. For k<1, the emphasis of the coder is better query response time. For k>1, emphasis is placed on minimizing expected file length.

Furthermore, in the case where, by using a Huffman coder, the codewords and corresponding lengths $L_{ai}$ that minimize the file header size have been obtained. This corresponds to minimizing C for k>>1. In this case, the Huffman algorithm generates the best possible prefix code solution for the cost function.

How to obtain the ordering Order(t) that minimizes the expected search length (i.e., minimizing C with k=0) is now described. The expected search length for the ordered elements $a_1, a_2, \ldots, a_n$ can be expressed as $$E[\text{Search Length}] = \sum_{i=1}^{n} L_{a_i} \left( p_{a_i} - \sum_{j=1}^{i-1} q_{a_j} p_{a_i a_j} \right) \quad (4)$$

where $pa_i a_j$ is the probability that both $a_i$ and $a_j$ occur in the file.

The ordering Order(t) of the term set $t_1, t_2, \ldots, t_n$ that minimizes the expected search length is obtained using the following result. Assume two term orders Order(t) and Order' (t) that are identical except for the two adjacent elements i and i+1. Let E[SL] and E[SL]' denote their expected search lengths. Then E[SL]<E[SL]' if and only if $$\frac{L_{a_i}}{q_{a_i}} < \frac{L_{a_{i+1}}}{q_{a_{i+1}}} \quad (5)$$

The inequality can be derived from Equation 4. This result states that, given the codewords, the criteria for minimizing search length is completely independent of the probabilities $p_{ai}$.

To obtain the ordering Order(t) that minimizes Equation 4, a bubble sort procedure is applied. Bubble sorts are known within the art. Order(t) is defined in an arbitrary manner to initialize the ordering. $a_n-1$ is compared with $a_n$ using Equation 5, swapping the order of the two terms if necessary. Then $a_n-2$ is compared with $a_n-1$, et seq. After n compares, the correct $t_i$ will be assigned to $a_1$. The procedure is repeated by comparing $a_n-1$ with $a_n$ and comparing adjacent terms until $a_2$, etc., are obtained. The resulting coder relies on simple comparison and can be performed in $O(n^2)$.

The result in Equation 5 is intuitively pleasing. For example, if assuming that all queries are equiprobable, then the file header is obtained by concatenating the codewords of all the terms that appear in that file, shortest codeword length first. Thus, to search for a particular query term in a file collection, each file header is sequentially searched for the corresponding term codeword. The search is terminated when the codeword is found (successful), or when a codeword is found that has a length greater than the length of the codeword that is being searched for (unsuccessful).

Generally, for each query term $t_j$ in the file collection, there is a ratio $L_{tj}/q_{tj}$. To search the collection for term $t_i$, each file header is searched sequentially. For each term $t_j$ read, the ratio $L_{tj}/q_{tj}$ is obtained from a look-up table and compared with $L_{ti}/q_{ti}$. If $L_{ti}/q_{ti} < L_{tj}/q_{tj}$ at any point in the file header, the search is terminated early as the query term does not exist in that file.

Figure 5:
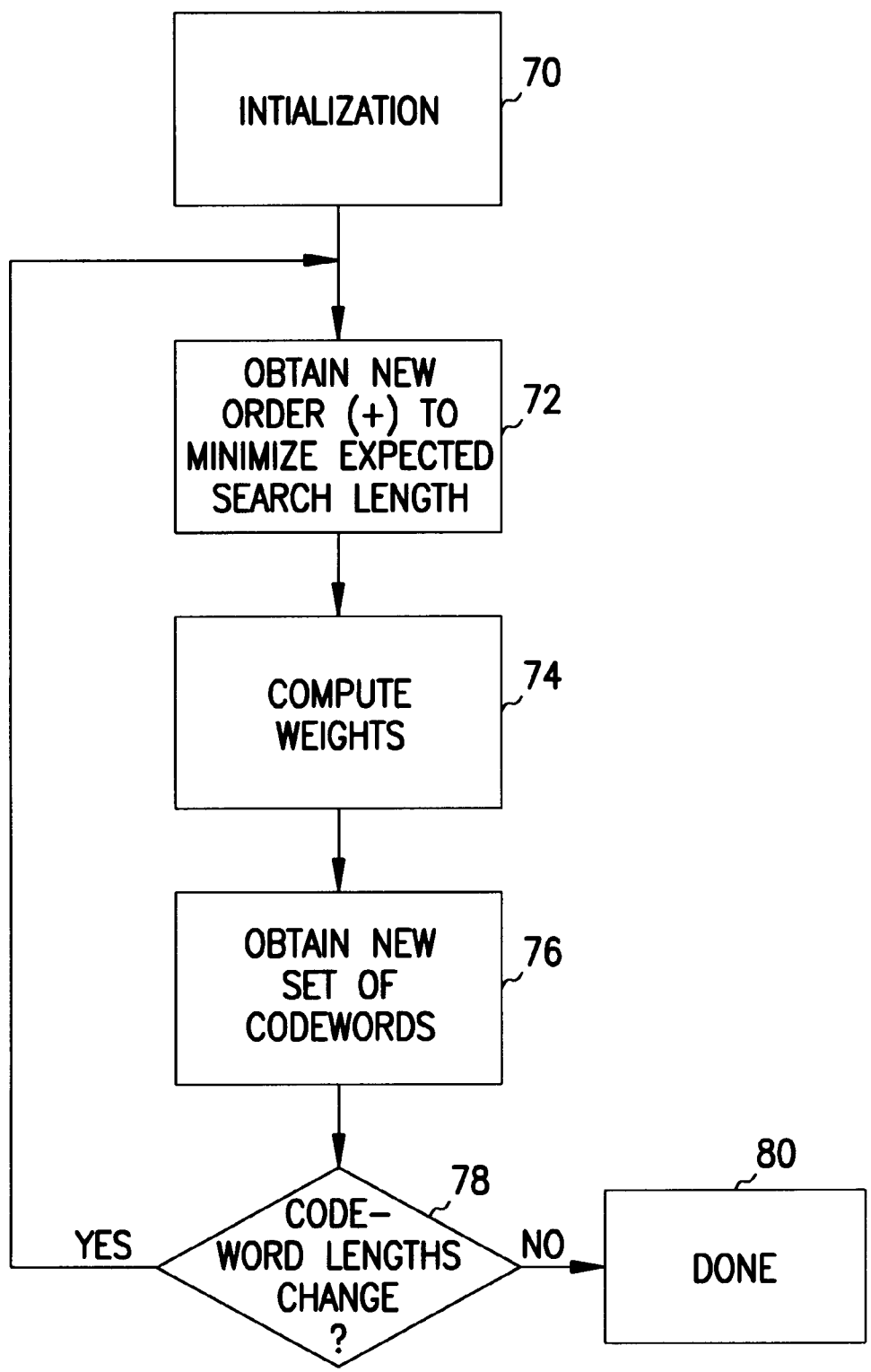
FIG. 5 is a flow chart of a method to simultaneously minimize both expected query length and file size, according to a preferred embodiment of the invention.

The results just described rely on the knowledge of the codeword lengths $L_{ai}$. However, the simultaneous minimization of both expected query length and file size as expressed in Equation 2 is preferable. Referring now to FIG. 5, a flow chart of a method to simultaneously minimize both expected query length and file size, according to a preferred embodiment of the invention, is shown. In step 70, the ordering Order(t) is initialized arbitrarily, and the codeword lengths $L_{ai}$ are initialized using a Huffman coder on $P_{ai}$, as has been described. In step 72, a new Order(t) is obtained to minimize expected search length, using Equation 5.

In step 74, the weights $w_{ai}$ are computed using the rewrite of Equation 2 using Equation 4 as follows $$C = \sum_{i=1}^{n} L_{a_i} \left( (k+1) p_{a_i} - \sum_{j=1}^{i-1} q_{a_j} P_{a_i a_j} \right) = \sum_{i=1}^{n} L_{a_i} w_{a_i} \quad (6)$$

In step 76, a new set of codewords with lengths Lai is obtained, again using a Huffman coder as has been described, on $w_{ai}$. In step 78, if the codeword lengths did not change, the method is complete (i.e., expected query length and file size have been simultaneously minimized), and the method ends at step 80. Otherwise, control reverts back to step 72 for a further iteration.

It has been found in numerous simulations that the method of FIG. 5 always converges to the global optimum. Convergence to the global optimum was checked using brute-force search O(n!) with up to ten query terms.

In practice, it is reasonable to assume that the term probability estimates $p_i$ remain fixed for a given collection of documents (i.e., input files having text, image, or other data). As a result, the codeword and codeword length assigned to each term remain fixed. With fixed codeword lengths, files remain fixed in size. The file headers are then regularly updated to minimize expected search length by simply reordering the terms in the header according to a new set of query probabilities. This could occur, for example, once a fixed number of queries have been posed. This method is suboptimal as codewords do not change. However, the resulting system remains close to optimal if term probability estimates $p_i$ do not change drastically.

In addition to reducing storage overhead and increasing retrieval speed, the described coder has several distinct advantages. First, it has built-in support for a nearness constraint between two or more query terms as the location of each query term is saved in the coded file. For example, two terms in a query may be required to occur adjacent to our within N words of each other. Second, the coder directly supports modification or manipulation of the coded data. For example, an efficient "find and replace" operation can be performed on the compressed data. Finally, the coder permits random access to the compressed text.

Image Coder for Content-Based Retrieval

The coder described in the previous section is readily applicable to image management. Image retrieval is based on properties of image regions and objects, e.g., geometrical shapes, faces, clouds, etc. The image coder described herein employs image segmentation, object coding, and multiresolution transforms for progressively refined content-based retrieval.

Figure 6:
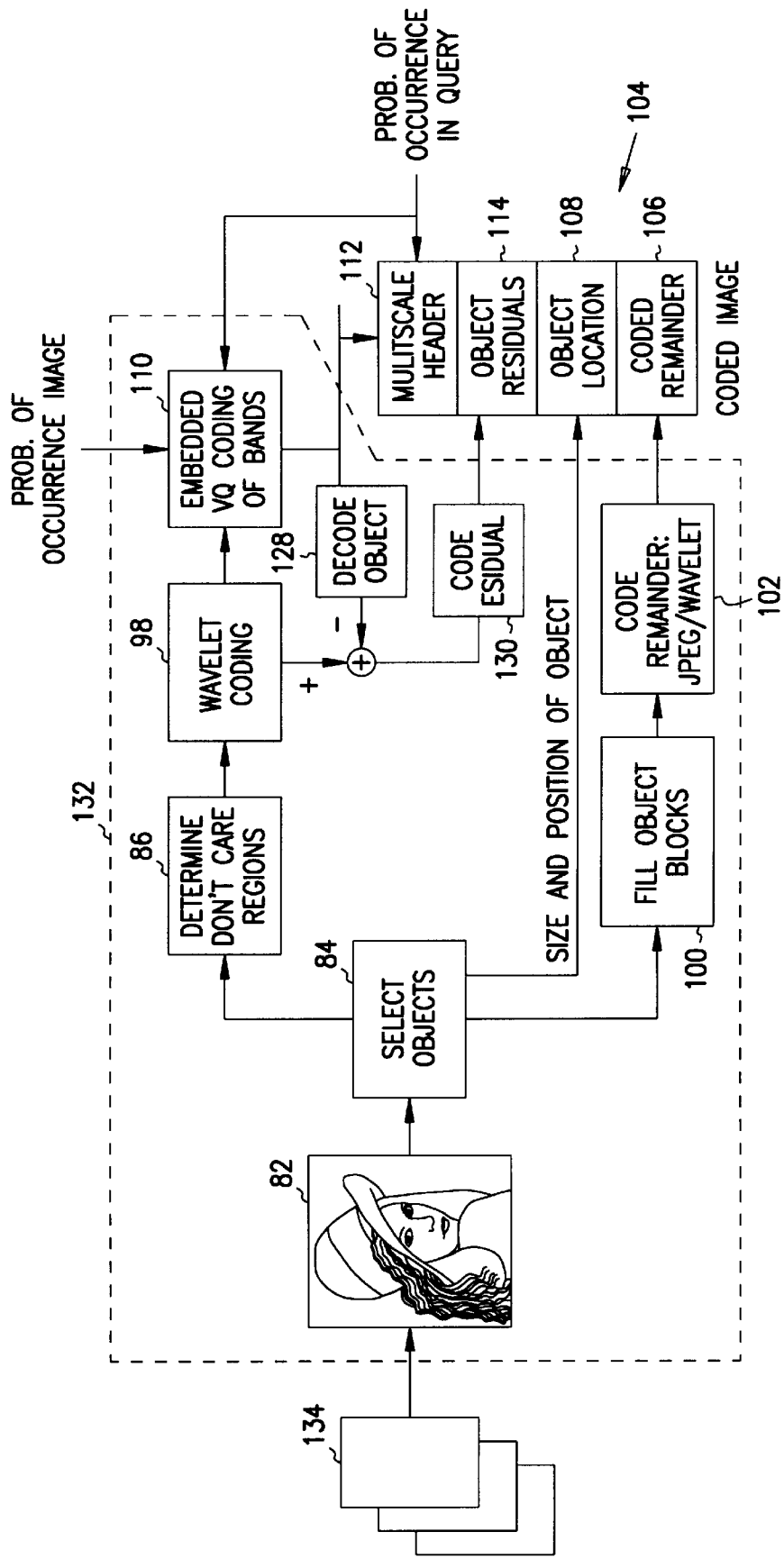
FIG. 6 is a diagram of an image coder according to a preferred embodiment of the invention.

Referring now to FIG. 6, a diagram of an image coder according to a preferred embodiment of the invention is shown. Coder 132 includes components 82, 84, 86, 98, 100, 102, 110, 128 and 130. Like the coder described in the previous section, coder 132 is typically implemented in software residing within the RAM, ROM or a storage device of a computer, and is executed by a processor thereof. Coder 132 codes one or more image input files 134 into one or more output files 104, in which the image input files 134 are compressed and indexed.

In component 82, an image retrieved from an input file 134 is blocked into 8×8 blocks. The block size plays the role of setting a lower limit on granularity of a retrieval. Blocks of size 8×8 are preferable for perceptual reasons. At a normal viewing distance approximately equal to the size of the screen (i.e., display device) on which the image is displayed, and with a screen resolution of up to 1280×1024 pixels as is customary, this block size is approximately the smallest size that can realistically be used to retrieve images.

In component 84, objects and regions within the image are defined. A segmentation algorithm is applied to the images to define image regions and objects. Segmentation algorithms are known within the art. Image regions and objects may denote any entities of interest in the given database application (viz., the given storage and indexing of images). Examples include shape-based objects such as faces, eyes, cars, building, windows, etc. Other examples are more texture- and color-based than shape-based, such as regions of grass, sand, clouds, trees, etc. Within this patent application, the term object in the context of image data denotes any type of segmented region or object.

In component 86, each segmented object in the image is covered with the smallest possible rectangular collection of the previously defined 8×8 blocks. Each collection, denoted an object superblock, includes the object and possibly background pixels and other objects or parts of objects that overlap the superblock. Superblocks are defined to make block transforms possible. To ensure efficiency, the coder avoids coding pixels more than once. If more than one superblock exists, this is readily accomplishing by defining "don't care" (DC) regions within each superblock, and is also accomplished in component 86.

Specifically, image pixels that exist in more than one superblock are marked for accurate coding only once. Transform coding techniques designed for arbitrarily-shaped image segments that are known within the art (e.g., such as that described in S. F. Chang and D. Messerschitt, "Transform Coding of Arbitrarily-Shaped Image Segments," Proceedings of the ACM Multimedia 93 (Anaheim, Calif.), 83–90 (1990)) may be used to avoid representing DC pixels. Preferably DC pixels are filled in with background pixels for coding and matching efficiency.

An example is illustrative to understand superblocks and DC regions. Referring to FIG. 7(a), a diagram of an exemplary image document processed by coder 132 and having two overlapping superblock regions is shown. Image 88 has two defined superblock regions, denoted by black-lined rectangles: superblock 90 and superblock 92. There is a region of overlap 94 that is a part of each superblock 90 and 92. Referring next to FIG. 7(b), a diagram of the region of overlap between the two superblock regions of FIG. 7(a) marked as a "Don't Care" (DC) region is shown. The overlapping region 94 is marked as a DC care region by coder 132, as indicated by the white X's 96.

Referring back to FIG. 6, in component 98 a wavelet transform is applied to each superblock. The wavelet transform is known within the art. The powerful multiresolution characteristic of a wavelet decomposition is thus exploited for recognitional purposes. The number of levels in the wavelet decomposition depends on the original size of the superblock. Specifically, the wavelet transform is applied until the lowest frequency subband is 8×8.

In component 100, the superblocks are removed from the original image by filling their object blocks with background pixels. In component 102, the remaining image regions (i.e., the 8×8 blocks that are not elements of a superblock) are coded using a simple block coding algorithm. Such algorithms are known within the art; preferably the JPEG algorithm is used. The JPEG codewords of the remaining image blocks are stored in section 106 of the output file 104. In addition, the position and size of each superblock is stored in section 108 of file 104. Sections 106 and 108 of file 104 correspond to sections 40 and 38 of file 34 of FIG. 2, respectively.

Beginning in component 110, the file header sections 112 and 114 of file 104 are constructed. File header sections 112 and 114 together correspond to section 36 of file 34 of FIG. 2. The coder constructs the file header in terms of the wavelet transform subbands of the segmented objects to minimize the size-search cost function. Vector quantization (VQ) is used to map the subband to finite dictionaries, which obtains the probability and query probability estimates used by the coder.

Figure 8:
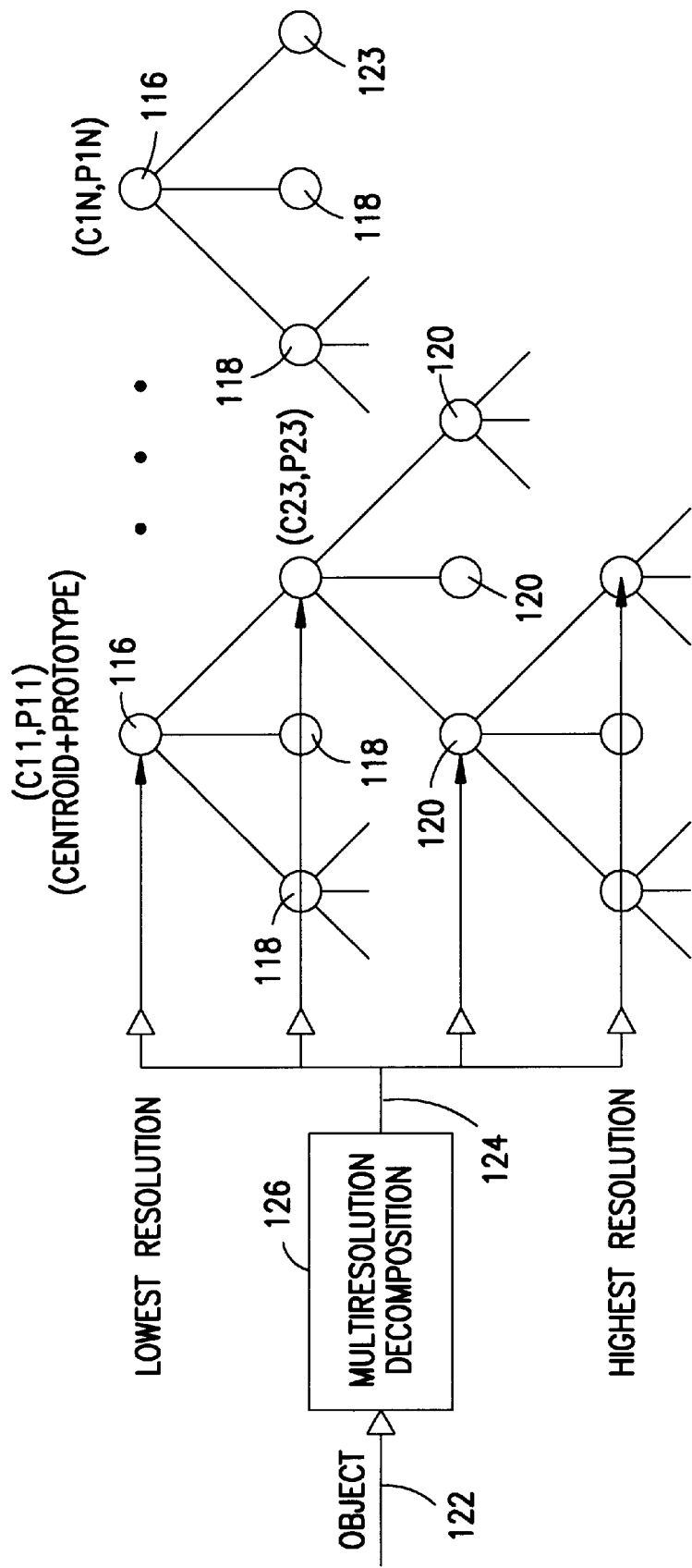
FIG. 8 is a diagram of a typical vector quantization used by an image coder according to a preferred embodiment of the invention.

Referring to FIG. 8, a diagram of a typical VQ used by an image coder according to a preferred embodiment of the invention is shown. The VQ dictionaries constructed by the coder are embedded by scale. The initial VQ dictionary has n terms 116 (centroids) based on the lowest resolution (8×8) subbands of a set of training objects. Each of the n terms 116 in this dictionary, in turn, has an associated dictionary having terms 118 that are based on the next higher resolution subbands. Each of these terms has an associated dictionary having terms 120 that are based on the still next higher resolution subbands, and so on.

The mapping of subbands 124 of object 122, obtained via wavelet transform multiresolution decomposition as represented by element 126 (i.e., performed in component 98 of FIG. 6), onto the embedded VQ dictionaries is based on a perceptual distance measure. In particular, a frequency domain masking model is constructed for each object, as known within the art. When computing distances to obtain the appropriate VQ dictionary entry, all masked components of the error image are set to zero. That is, only non-masked components contribute to the norm of the error.

Referring back to FIG. 6, the probabilities associated with each term in the dictionary determines the proper location and codeword length of each subband codeword in the compressed file header section 112 of file 104. Since the finite dictionaries are embedded from one scale to the next scale, the probability and query probability assigned to each dictionary entry subband depend on previous (coarser) subbands, i.e., p(b)=p(b|a)p(a).

The image file header section 112 is ordered in a coarse-to-fine manner. The first layer of section 112 includes the lowest resolution (coarsest) subband. Within this layer, the 8×8 subband components of all the objects in the image are ordered according to probability estimates obtained from the VQ mapping and codeword lengths. The next layers in the file header includes all the 8×16, 16×8, 16×16, etc., subbands of the objects in the image. Mapping subbands larger than 8×8 to a finite dictionary is simplified using previous subband mappings. Specifically, the mapping exploits correlation that exists between subbands to greatly reduce the VQ search space for large subbands. Finally, in component 128 the VQ embedded codings are decoded, and combined with the initial wavelet coding output by component 98. This residual is then itself coded in component 130 and stored in section 114 of file 104.

The described image coder has several advantageous properties in addition to efficient storage. First, the coder supports a special kind of progressive image transmission. Specifically, the image headers may be decoded and placed in a blank image according to their locations. In this way, browsing of objects in an image is supported. Conventional progressive image transmission decodes a coarse-to-fine version of the entire image. The inventive image coder decodes a coarse-to-fine version of the objects within an image. For the same number of decoded bits, the inventive image decoder presents a much sharper version of important image objects.

Second, manipulation and modification of image objects regions is supported as the objects are encoded in the file header. This is not possible with a separate index. Third, matching a query object with image objects may be made location dependent. Since the location of each object in the image is stored, the query specification may include an image location where the object should appear.

Searching, Decoding and Browsing Coded Image Documents

Once an image collection has been coded used the coder described in the preceding section, the resulting coded files represent an efficient storage and indexing of the image collection. These files are amenable to a variety of user-desired operations, including searching, decoding, and browsing. Searching is the process by which the entire image collection is searched to find the image or images having a particular user-defined query object. Decoding is the process by which an image is completely decoded for display on a display device. Finally, browsing is the process by which one or more images are quickly displayed on the display device with enough decoding to render the displayed images recognizable, but not so much to overly slow down the decoding process.

Figure 9:
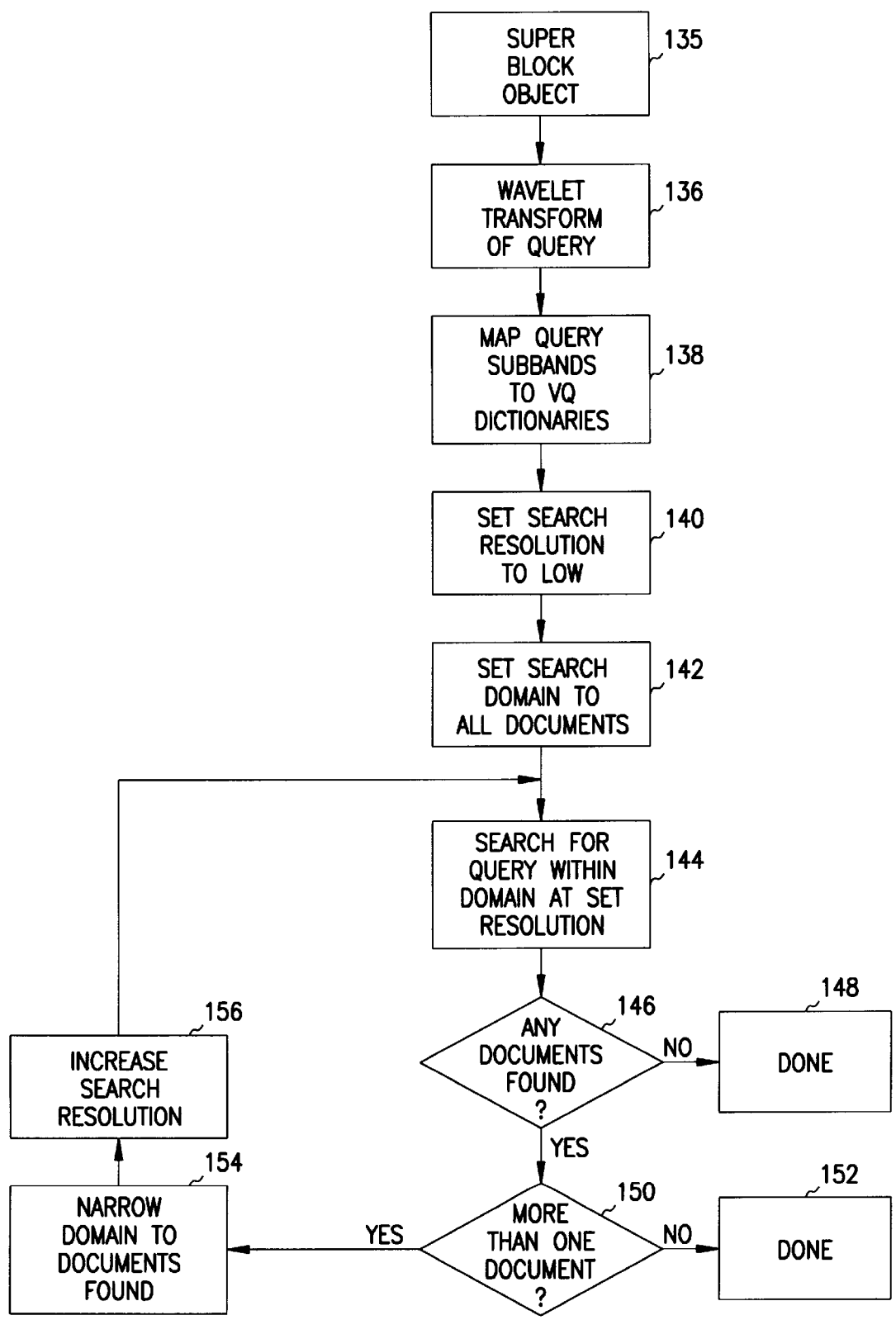
FIG. 9 is a flow chart of a method to search image documents for a user-defined query, according to an embodiment of the invention.

Referring first to FIG. 9, a flow chart of a method to search image documents produced by the described image coder for a user-defined query, according to one embodiment of the invention, is shown. The user-defined query is in the form of a sample image object. In step 135, the query object is superblocked by being covered with the smallest possible rectangular collection of 8×8 block, as has been described. In step 136, the superblocked query object is applied as an input to the wavelet transform, as has been described.

In step 138, the resulting query term subbands are mapped to the finite VQ dictionaries to obtain the appropriate codewords for the search. As the layers in the file header are ordered from lowest resolution to highest resolution subbands, the subband sizes are also ordered from smallest to largest, i.e., 8×8, then 8×16, etc.

A search begins at the lowest resolution, and by searching all the documents available. Therefore, in step 140 the search resolution is set to the lowest resolution (8×8), and in step 142 the search domain is set to all documents. In step 144, all of the 8×8 subband layers in the image collection are read, and compared to the query object. That is, the images are searched to determine if they contain the query object. If no documents are found in step 146, the search ends at step 148 (unsuccessful). If only one document is found in step 150, the search ends at step 152 (successful, with the best one document that includes the query object).

Otherwise, in step 154, the search domain is narrowed to the documents found, and in step 156 the search resolution is increased. Searching then proceeds in step 144 on the remaining documents in terms of the next subband (i.e., the next higher resolution). In this way, a progressive refinement retrieval is achieved by successively reducing the number of searched files as more bits are read. This offers a significant speed improvement by quickly rejecting files as potential retrievals and concentrating search resources on fewer files.

Figure 10:
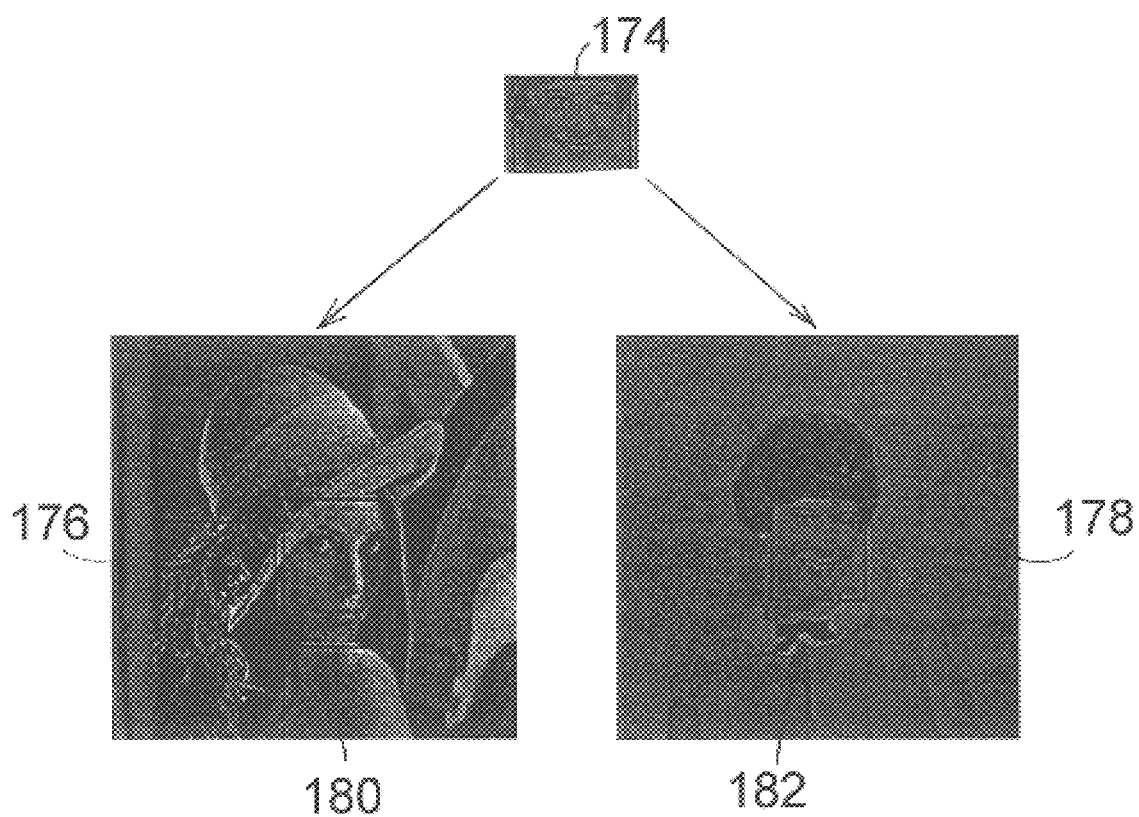
FIG. 10 is a diagram of an exemplary query object and two-document image collection to illustrate the operation of the search method of FIG. 9.

An example is illustrative to understanding the described search process. Referring to FIG. 10, a query image and a two-document image collection coded according to an embodiment of the invention are shown. Query object 174 is a user-defined query object. The image collection consists of image 176 and image 178. Image 176 has face object 180 defined, and image 178 has face object 182 defined. Note that query object 174 matches face object 182 of image 178. For a low-resolution search, the described search process may match both image 176 and image 178 as having a face object similar to that of object 174. At higher resolutions, however, the described search process will match only object 182 of image 178, and will discard object 180 of image 176 as not matching.

Figure 11:
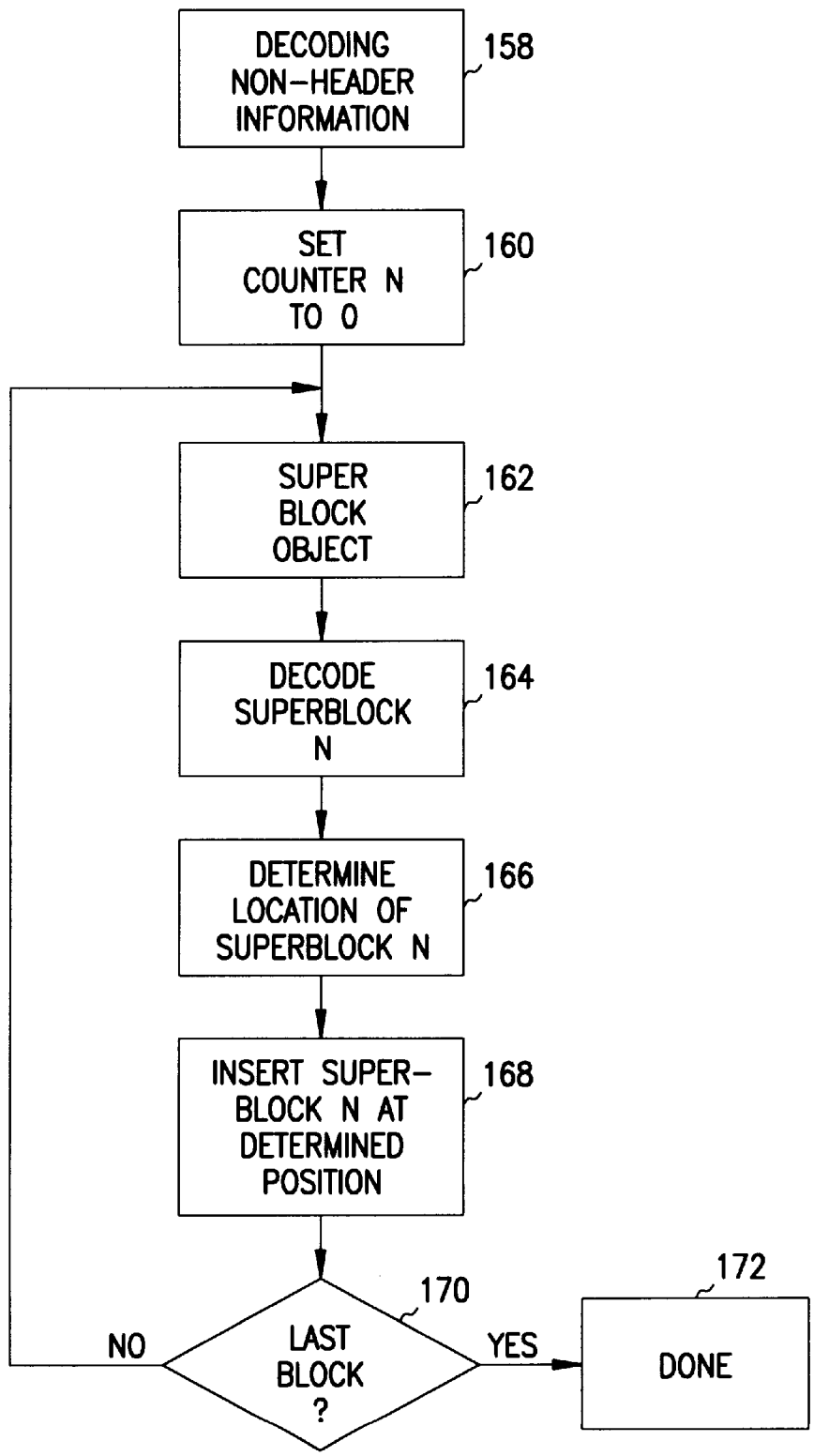
FIG. 11 is a flow chart of a method to decode image documents, according to an embodiment of the invention.

Referring next to FIG. 11, a flow chart of a method to decode image documents produced by the described image coder, according to one embodiment of the invention, is shown. In step 158, the non-header information of an input file is decoded (decompressed) and displayed on the display device. This information includes those parts of the image that were not part of any superblock (i.e., and were stored in section 106 of file 104 as shown in FIG. 6). After the non-header information has been decoded and displayed, the header information is decoded.

In step 160, a counter n is set to 0, and, in step 162, the counter n is increased by one. In step 164, superblock n coded in the input file is decoded, where superblock 1 is the first superblock, superblock 2 is the second superblock, superblock n is the nth superblock in the coded input file. Each superblock n is decoded by passing through an inverse wavelet transform. (The superblock n is that information which was stored in sections 112 and/or 114 of file 104 as shown in FIG. 6.) In step 166, the location of superblock n is determined (i.e., as was stored in section 108 of file 104 as shown in FIG. 6). In step 168, the superblock n is displayed on the display device at its determined position. If the superblock n just displayed was the last superblock in the coded input file, the method ends at step 172; otherwise, the process is repeated with the next superblock.

The preferred browsing strategy of the invention permits browsing of image objects in full detail by displaying image object prototypes in place of the actual objects. The prototype is a perceptually motivated approximation to the image object it represents. For example, the text object "Boeing 747" may have defined a coarse-to-fine text prototype description of "plane," "Boeing plane," and finally "Boeing 747." In an image object environment, the prototypes are image data.

For example, consider an imaging containing a "Boeing 747" object. Early in the retrieval process—i.e., after only a few bits have been read, the displayed image may show the "Boeing 747" object represented by a generic (i.e., low resolution prototype) plane. Upon reading more bits, the plane object may be represented by a plane more similar to the "Boeing 747" (i.e., a higher resolution prototype). When the retrieval is complete, the original plane is displayed.

The prototype that represents each object during the retrieval process depends on the number of bits read to that point in the retrieval. The displayed objects are correctly placed and scaled within the retrieved image, but they may be only an approximate (i.e., "low resolution" in terms of information) version of the actual blurred objects. Note that the displayed prototypes are high quality, i.e., real objects, not blurred objects. Multiresolution prototypes are used to exploit a person's ability to understand and relate objects within an image.

Multiscale prototypes are constructed from the previously described embedded VQ books shown in FIG. 8. Prototypes are defined using the embedded structure of the VQ dictionaries (codebooks). Referring back to FIG. 8, each term 116, 118, 120, etc., within a dictionary has an associated prototype object $p_{ij}$ in addition to a centroid $c_{ij}$. The prototype object for a codebook term (entry) is defined as the object having a subband at that resolution scale i that is nearest to the centroid $c_{ij}$.

Note that the prototypes are actual objects contained in the image collection. For example, consider first terms in the lowest resolution codebook. Every object in the image collection having a coarsest subband mapped to centroid $c_{11}$ is a candidate prototype. The object having a coarsest subband nearest to $c_{11}$ is used as its prototype, $p_{11}$.

The prototype object is used to represent all other objects near it at a given scale. At low scale, the number of objects mapped to a codeword is large and the prototype is "low" in resolution. At higher scale, the prototype becomes more refined as the region it represents diminishes. At each stage during the retrieval (i.e., during browsing), the prototype is displayed rather than the centroid value. The size and location of the original image are used to resize and place the prototype in the proper location.

Figure 12:
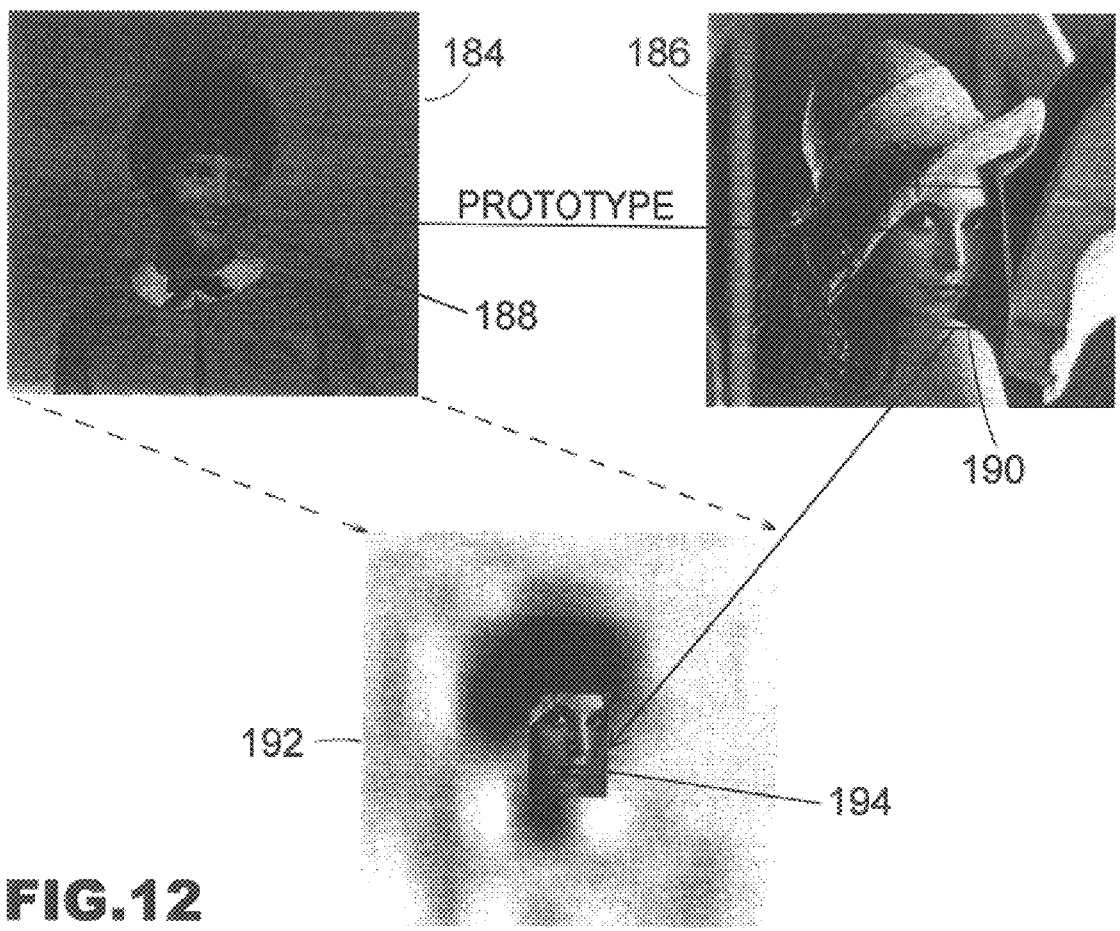
FIG. 12 is a diagram of an exemplary two-document image collection and a browsable low-resolution view of one of those images to illustrate the operation of a browsing method of the invention; and, FIG. 13 is a diagram of a typical vector quantization used by an image coder, and also including B-spline representation, according to an alternative embodiment of the invention.

An example is illustrative to understanding the preferred inventive prototype-based browsing of an image collection. Referring to FIG. 12, a two-document image collection coded according to an embodiment of the invention, and a browsable low-resolution view of one of those images, are shown. Both image 184 and image 186 are coded by a coder according to an embodiment of the invention. Each has a face object; image 184 has face object 188, and image 186 has face object 190. Face object 190 is the prototype for face objects at a low resolution.

Image 192 is image 184 viewed at this low image. The background data (i.e., non-face object data) is very blurry and nearly incomprehensible, because only a few bits of the image have been retrieved. Note, however, that face object 194 is actually face object 190, and not face object 188 as would be the case at a higher resolution. This is because face object 188 is the prototype fact object at this low resolution. It is shown clearly as face object 194 when image 188 is browsed as the low resolution image 192.

This is advantageous, because it permits a user to determine the kind of image that image 192 is, even at a very low resolution. Looking at image 192, the user can easily conclude that the image is of at least a woman's face. Without object 194, however, image 192 is nearly incomprehensible. The inventive browsing strategy, therefore, permits early user recognition of images even when those images are displayed at a very low resolution.

Alternative Embodiment

An alternative embodiment of the invention utilizes B-spline representation in conjunction with the embedded wavelet subband dictionaries that have been described. The query terms present in each image are represented in terms of affine-invariant B-spline moments and wavelet transform subbands. The dual representation supports a two-stage image retrieval system. The B-spline curve representation of an object contour has the property of affine invariance for classification and recognition. This is used as a first stage retrieval mechanism. A user-posed query, in the form of a sketch or an example image, is mapped to a dictionary of prototype object contours represented in terms of affine invariant B-spline moments.

The B-spline mapping serves two purposes. First, it reduces the query search space to a subset of the original database. Second, it provides an estimate of the affine transformation between the query and the prototypes. The second stage consists of a set of embedded VQ dictionaries of multiresolution subbands of image objects. Each prototype curve (first stage) points to one or more VQ dictionaries (second stage). The affine transformation estimated from the B-spline mapping is employed as a correction factor for the multiresolution VQ mapping. A simple bit string matching algorithm compares the resulting query VQ codewords with the codwords of the database images for retrieval. In addition, the contour prototypes and multiresolution subbands may be displayed as a representative crosssection of the iamges present in the database for browsing.

B-splines are piecewise polynomial functions that provide local approximations to curves and contours. They are specified in terms of order and a small number of control points. A $k^{th}$ order B-spline (which is $C^{k-1}$ continuous) with n+1 parameters $C_0, C_1, \ldots, C_n$ (control points) consists of n−k+1 connected curve segments $r_i(t)=[x_i(t),y_i(t)]$. Each curve segment is a linear combination of k+1 polynomials of order k in the parameter t, which is normalized from between 0 and 1 for each segment. The estimate of a whole curve r(t') consists of a concatenation of curve segments $r_i(t)$ $$\tau(t') = \sum_{i=1}^{n-2} \tau_i(t' - i + 1) \tag{7}$$

B-spline representations have several favorable properties. In particular, a B-spline subjected to an affine transformation is still a B-spline whose control points are obtained by subjecting the original B-spline control points to that affine transformation. Efficient techniques to obtain B-spline order and control points are known within the art. These known techniques also permit estimation of affine transformations between a curve and a set of prototypes.

Figure 13:
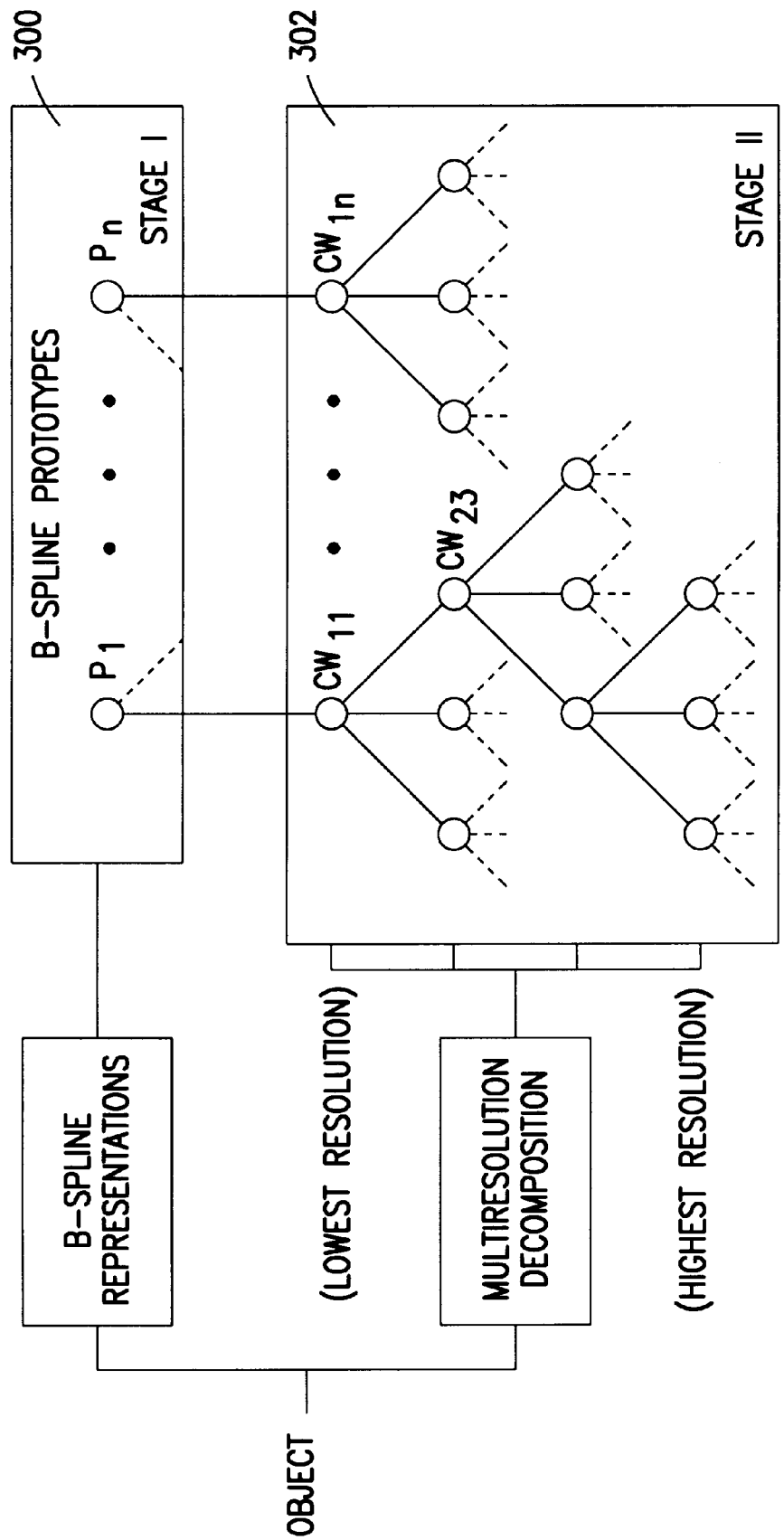

In the alternative embodiment, query objects are represented in terms of B-spline control points and mapped to the nearest prototype from a dictionary of N B-spline prototypes: $P_1, P_2, \ldots P_N$. This is shown in FIG. 13, which is a diagram of a typical vector quantization used by an image coder, and also including B-spline representation, according to an alternative embodiment of the invention. The VQ dictionary of FIG. 13 is similar to that shown in and described in conjunction with FIG. 8, except that it also includes the B-spline representation. There are two stages shown, a B-spline representation stage 300, and a wavelet transform multiresolution subbands representation stage 302. Each B-spline prototype from stage 300 points to one or more of the lowest VQ codebooks in stage 302. Each B-spline prototype may be related to several lowest scale VQ codebooks through an affine transformation.

A data management system according to the alternative embodiment supports two types of queries. To pose a query by example, a user extracts an object from a sample image and presents it to the system. Alternatively, a simple sketch may be used as the query. To initiate a search, the query object is presented in terms of B-splines and mapped to a prototype object.

The estimation of the affine transformation is used to correct the translation, scale and rotation of the query object prior to the second stage. In particular, the B-spline mapping provides an estimate of the rotation/sclaine matrix L and translation b of an affine transformed curve r'(t') of a prototype curve $r(t'):r'(t')=[L]r(t')+b$. The inverse affine transformation is applied to the input query prior to subband decomposition. Once the query term is corrected, it is applied as an input to the wavelet transform. Each subband of the query term object is mapped to the appropriate VQ dictionary ot obtain a codeword for the search.

Note that a codeword is obtained for each subband. The search is performed by comparing the query codeword for the current subband i with the stored codewords at subband i from all the images in the database. The search proceeds subband by subband, from the lowest resolution to highest resolution subbands. As codewords are looked for, only simple bit pattern comparison are required. No distance computations are required during a query.

Conclusion

A computerized image and document management system for content-based retrieval has been described. The coder of the system integrates content-based retrieval support directly into compressed files. The inventive system is very flexible because it minimizes a weighted sum of the expected size of the compressed files and the expected query response time. The coder segments each image into objects and computes a multiresolution representation of each segmented object in one embodiment. The coder then assigns codewords and relative ordering to each segmented object and stores the codewords as part of the compressed data. The object's probabilities of occurrence in the database and occurrence in a query determine the codewords and relatively ordering assigned to the object.

The system provides a progressive refinement retrieval by successively reducing the number of searched files as more bits are read. It also supports progressive transmission and modification of compressed data. Furthermore, the inventive system uses a novel object representation based on embedded prototypes, permitting high-quality browsing of retrieved images at low bit rates.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized method for storing data in an electronically stored file for later retrieval, the method comprising the steps of:

extracting a plurality of query objects from at least one input file;

coding a set of codewords in a particular order, each codeword corresponding to a query object and having a particular length;

determining instances of each query object within the at least one input file; and, compressing non-query object data within each input file.

2. The computerized method of claim 1, wherein the particular length of each codeword and the particular order of the set of codewords are optimized to minimize an expected length of the electronically stored file.

3. The computerized method of claim 1, wherein the particular length of each codeword and the particular order of the set of codewords are optimized to minimize an expected query response time in searching the electronically stored file.

4. The computerized method of claim 1, wherein the particular length of each codeword and the particular order of the set of codewords are optimized both to minimize an expected length of the electronically stored file and an expected query response time in searching the electronically stored file.

5. The computerized method of claim 1, wherein each codeword corresponds to a multiresolution representation of each query object.

6. The computerized method of claim 1, wherein each codeword has a particular length n, and is unique compared to the first n characters of every other codeword.

7. A computerized method for decoding an electronically stored file having a file header of concatenated codewords corresponding to query objects, data denoting a plurality of instances of the objects within the file, and non-query object data, the method comprising the steps of:

decoding the query objects from the concatenated codewords; and, inserting each query object within the non-query object data at each instance of the query object.

8. The computerized method of claim 7, wherein the non-query object data is compressed, and further comprising the step of decompressing the non-query object data.

9. A computerized method for browsing an electronically stored file having a file header of concatenated codewords corresponding to multiresolution representations of query objects, data denoting a plurality of instances of the objects within the file, and non-query object data, the method comprising the steps of:

decoding at least one query object from the concatenated codewords at a particular resolution;

matching each query object of the at least one query object to a corresponding prototype object for the particular resolution; and, inserting the corresponding prototype object for the particular resolution of each query object of the at least one query object at each instance of the query object.

10. A data structure for electronically storing a file comprising:

a file header of concatenated codewords, each codeword corresponding to a query object;

a set of indices denoting a plurality of instances of the objects within the file; and, non-query object data.

11. The data structure of claim 10, wherein the non-query object data is compressed.

12. The data structure of claim 10, wherein each codeword corresponds to a multiresolution representation of each query object.

13. A computerized method for storing at least one image in an electronically stored file for later retrieval, the method comprising the steps of:

blocking each image into a plurality of blocks smaller than the image;

defining one or more objects of the image using a segmentation algorithm;

associating each object with a number of the blocks to form a superblock corresponding to the object;

applying a wavelet transform to each superblock to generate query objects;

coding a set of codewords in a particular order, each codeword corresponding to a query object and having a particular length; and, determining the instances of each query object within each image.

14. The computerized method of claim 13, further comprising the step of coding non-superblocked regions of each image.

15. The computerized method of claim 13, wherein each codeword corresponds to a multiresolution representation of each query object.

16. The computerized method of claim 15, wherein the multiresolution representation of each query object includes a plurality of subbands.

17. The computerized method of claim 16, wherein the step of coding maps the plurality of subbands to finite dictionaries using vector quantization.

18. The computerized method of claim 15, further comprising the step of mapping one of a like subset of query objects at a particular resolution as a prototype object for the like subset of query objects at the particular resolution.

19. A computerized method for searching for a desired object within an electronically stored file of at least one image comprising the steps of:

associating the desired object with a number of blocks to form a superblock corresponding to the object;

applying a wavelet transform to the superblock to generate a query object;

searching the electronically stored file for the query object on a resolution-by-resolution basis.

20. The computerized method of claim 19, wherein the step of searching comprises the steps of:

searching each image for the query object at a first resolution; and, searching the images in which the query object was found at the first resolution for the query object at a second resolution.

21. The computerized method of claim 20, wherein the step of searching further comprises the step of searching the images in which the query object was found at the second resolution for the query object at a third resolution.

* * * * *

UNITED STATES PATENT AND TRADEMARK OFFICE
CERTIFICATE OF CORRECTION

PATENT NO. : 5,987,459
DATED: Nov. 16, 1999
INVENTOR(S) : Mitchell D. Swanson et al.

It is certified that error appears in the above-identified patent and that said Letters Patent is hereby corrected as shown below:

In line 2 of the Abstract, delete "tent-based" and insert -- content-based --, therefor.

In column 7, line 8, delete "$P_{a_i}$" and insert -- $P'_{a_i}$ --, therefor.

In column 1, line 17, insert --The invention was made with the support of NIH Grant No. Air Force #AF/F49620-94-1-0461, ARPA #AF/F49620-93-1-0558. The U.S. government has certain rights in the invention.--

Signed and Sealed this

Twentieth Day of March, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO. : 5,987,459  
DATED : November 16, 1999  
INVENTOR(S) : Mitchell D. Swanson et al.

Page 1 of 1

It is certified that error appears in the above-identified patent and that said Letters Patent is hereby corrected as shown below:

<u>Column 1</u>,
Line 17, delete "NIH".

Signed and Sealed this

Thirtieth Day of October, 2001

Attest:

*Nicholas P. Godici*

Attesting Officer

NICHOLAS P. GODICI  
*Acting Director of the United States Patent and Trademark Office*